UNITED STATES PATENT OFFICE.

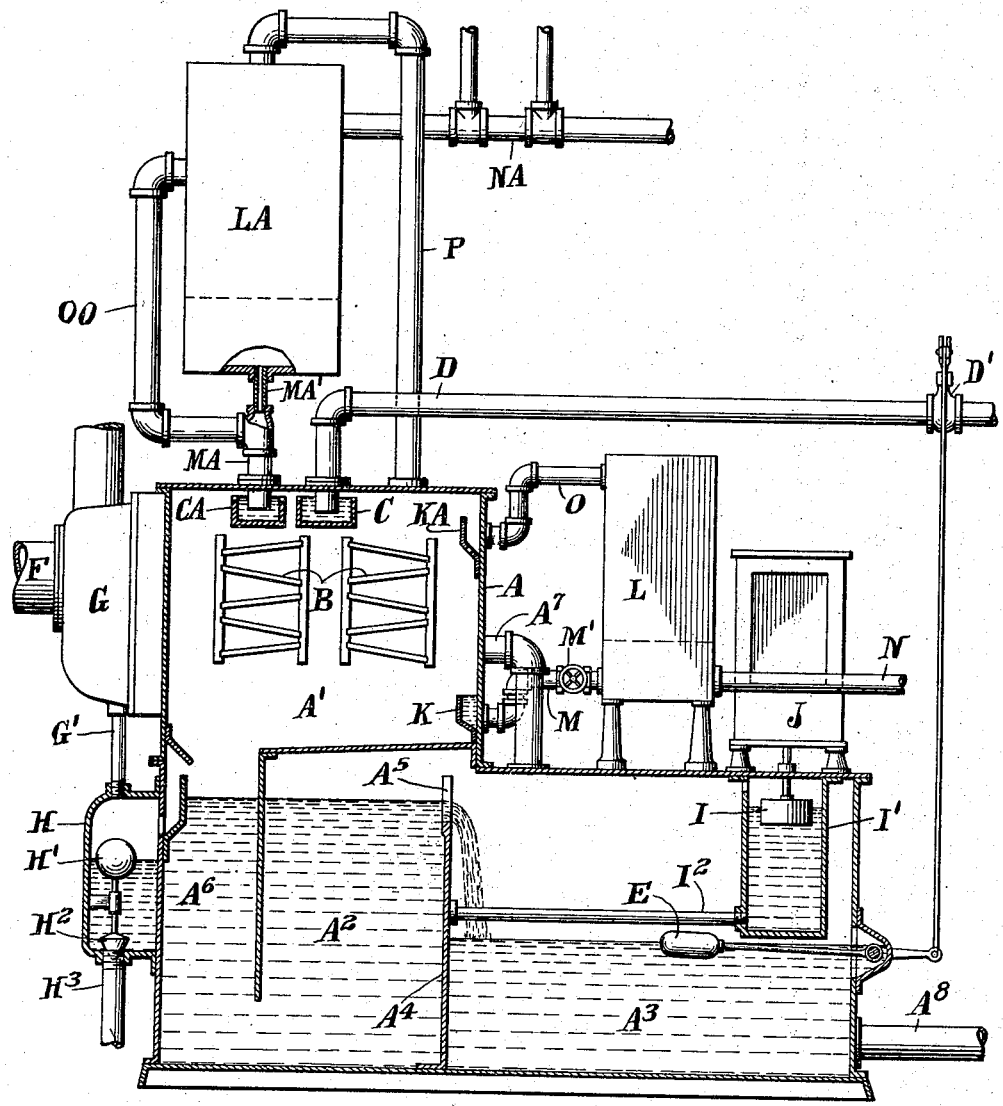

JOSEPH W. GAMBLE, OF PHILADELPHIA, PENNSYLVANIA, ASSIGNOR TO JOSEPH S. LOVERING WHARTON, WILLIAM S. HALLOWELL, AND JOHN C. JONES, ALL OF PHILADELPHIA, PENNSYLVANIA, DOING BUSINESS AS FIRM OF HARRISON SAFETY BOILER WORKS, OF PHILADELPHIA, PENNSYLVANIA.

MEASURING APPARATUS.

1,218,643.  Specification of Letters Patent.  Patented Mar. 13, 1917.

Application filed March 16, 1915. Serial No. 14,810.

*To all whom it may concern:*

Be it known that I, JOSEPH W. GAMBLE, a citizen of the United States of America, residing in the city and county of Philadelphia, in the State of Pennsylvania, have invented certain new and useful Improvements in Measuring Apparatus, of which the following is a true and exact description, reference being had to the accompanying drawings, which form a part thereof.

My present invention relates to liquid measuring apparatus of the type in which the quantity rate of flow of a liquid is determined from the variations in the accumulation of liquid on the supply side of a weir over which the liquid to be measured flows.

The general object of my invention is to provide simple and effective means for equalizing the flow of the liquid to be measured into the inlet compartment of the weir chamber, to thereby avoid or restrict pulsations in the height of liquid level in said chamber, injuriously affecting the accuracy of the measuring apparatus.

My invention was especially devised for use in connection with measuring apparatus receiving and measuring water supplied from two sources, the supply from one source being regulated in response to the accumulation of the water in the outlet compartment of the weir chamber, while the supply from the other source is not directly dependent on, or affected by the conditions prevailing in the weir tank, the last mentioned source of supply being the so called "heater returns"; that is, water of condensation, or drip, from steam pipes, heating coils and the like. The regulated supply may be raw water or partly raw make up water and partly water of condensation from the hot wells of condensers and the like.

In such apparatus it is desirable to utilize all of the water supplied by the heater returns, if possible, as this water is usually perfectly pure and usually, also, reaches the metering heater at a temperature higher than that at which the remaining water reaches the heater. Furthermore, it is practically impossible, or at least undesirable to control the heater returns by float valves or the like. Even though the water supplied by the heater returns is usually quite small in comparison with the total volume of water passing through the metering heater, the supply of water through the heating returns is apt to be highly intermittent and the momentary discharge, as such apparatus has heretofore been arranged and operated, has frequently been great enough to cause fluctuations in the height of liquid level in the supply compartment of the weir chamber, appreciably affecting the accuracy of the measurements obtained.

To avoid consequent disturbance in the operation my invention comprises means for eliminating, or materially minimizing the objectionable fluctuation in level due to the intermittent discharge of heater returns without passing the heater returns to waste, and without requiring the storage exterior of the heater of more than a comparatively small quantity of heater returns. This I accomplish by providing an equalizing reservoir and connecting the latter to the metering heater by two channels, one of which, opening from the reservoir at a lower level is of such a restricted flow capacity that water will not be discharged from the reservoir therethrough at a rate fast enough to produce undesirable pulsations in level; while the second channel opening from the reservoir at a higher level is of sufficient flow capacity to pass all of the water entering the reservoir and not discharged by the restricted channel in case the level in the reservoir reaches the outlet to the upper channel.

The various features of novelty which characterize my invention are pointed out with particularity in the claims annexed to and forming a part of this specification. For a better understanding of the invention however, and the advantages possessed by it, reference should be had to the accompanying drawings and descriptive matter in which I have illustrated a preferred form of apparatus embodying my invention.

The one figure of the drawings is a somewhat diagrammatic elevation partly in section.

In the drawings, A represents the tank or inclosing housing of a "metering heater" comprising an open feed water heater and weir measuring apparatus for measuring the liquid passing out of the heater. In the heating chamber $A^1$, inclosed by the housing A, are mounted the usual splash trays B, onto which water flows from the overflow trough C. The water passes from the lower end of the chamber $A^1$ into the inlet compartment $A^2$ of the weir measuring chamber located in the lower portion of the housing A. From the compartment $A^2$ the water flows through the weir notch or weir notches $A^5$ at the upper edge of a partition $A^4$, into the outlet compartment $A^3$ of the weir chamber. Water is supplied to the trough C through the pipe D and the flow of water through the pipe D is automatically controlled in response to the accumulation of the water in the outlet compartment $A^3$ by means of the float E therein, and the valve $D^1$, located in the pipe D, which is opened and closed by the float E as the water level in the chamber $A^3$ falls below or rises to a predetermined level.

The exhaust steam for heating the water in the chamber $A^1$ is supplied to the latter through the usual oil separator G, the drip from which is passed into a float chamber H in which is mounted a float $H^1$ operating through valve $H^2$ to control the waste or drain outlet $H^3$ from the chamber H. The maximum height of liquid level in the chamber $A^2$ is fixed by the level of the upper edge of the trough member $A^6$ over which water may flow to waste through the float chamber H. $A^7$ represents the usual steam equalizing connection between the upper ends of the heating chamber $A^1$, and the weir chamber. $A^8$ represents the usual outlet to a boiler feed pump or the like, from the chamber $A^3$ for the measured water.

The rate of flow over the weir is determined in the usual manner by means of a float I, shown as working in a float chamber $I^1$ connected to the compartment $A^2$ below the lowermost level of flow over the weir by the pipe $I^2$. The float I is employed to actuate the usual indicating, integrating or recording mechanism located in the instrument case J.

In so far as above described the apparatus shown by the drawings is constructed in accordance with the usual manner and embodies nothing now novel with me. The apparatus shown in the drawings does differ, however, from that found in the prior art, in the arrangement which I will now describe for regulating the flow of the "heater returns" into the chamber $A^1$.

The heater returns pipe N is connected to a storage reservoir L preferably located adjacent the tank A and connected to the latter by a pipe M which leads from the lower end of the reservoir L to the heating chamber $A^1$ and is arranged to discharge by a gravity flow into the latter. The flow capacity of the discharge connection M is restricted as by means of a throttle valve $M^1$ located therein, or by the simple expedient of using a small diameter pipe or section of pipe so that the flow out of the reservoir through the connection M will not be great enough to produce an objectionable fluctuation in level in the compartment $A^2$. This means in practice that the discharge from the reservoir through the connection M will, at times, be appreciably less rapid than the influx of water into the reservoir. To a considerable extent, this temporary excess of the water supplied to, over that discharged from, the reservoir L can be accommodated by the storage capacity of the reservoir. However, it is ordinarily not desirable to provide a reservoir of sufficient capacity to take care of the maximum excess and I avoid the necessity of such a large reservoir by providing a second discharge connection O from the reservoir L to the chamber $A^1$. The discharge connection O opens from the reservoir L at a level appreciably above that at which the connection M opens and is of sufficient capacity to pass all the water, not escaping through the connection M when the level in the reservoir rises to the level at which the discharge through the pipe O begins. The pipe O also serves in the normal operation of the apparatus to equalize the steam pressure in the chamber $A^1$ and the gaseous pressure in the upper portion of the reservoir L. As shown, the pipes M and O discharge into overflow troughs K and KA located within the chamber A. The trough KA is shown as formed with a leakage port or ports so that it will not retain a water seal when no water is flowing through the pipe O.

The reservoir L connected and arranged as shown, is adapted for use only where the water passing therethrough is hot enough so that it is not necessary to pass it over the heating trays in the heating chamber $A^1$, and there is no possibility of steam being discharged into the reservoir through the pipe N. In some cases, however, it is desirable to pass the water supplied by the heater returns pipe, or from a like source, over the heating trays and where, as in the case of trap discharges, some steam is passed to the equalizing reservoir with the water, the supply connection should open to the reservoir above the maximum height of water level therein. The reservoir LA is arranged to meet these conditions. As shown, the heating returns pipe NA transmits trap discharges to the flow equalizing reservoir LA adjacent its upper end and the water passing into the heating chamber $A^1$ through the reservoir LA, is shown as discharged on to one set of trays B through the pipe MA and trough CA. The pipe MA is connected to the bottom of the reservoir LA through the pipe section $MA^1$, of reduced diameter, and is connected to the reservoir LA adjacent its upper end by the unrestricted overflow pipe OO. P represents a separate gaseous pressure equalizing connection between the upper end of the reservoir LA and the upper end of the chamber $A^1$.

While I have shown my invention as employed in connection with a so called metering heater it is not limited to such use and in so far as the present invention is concerned the chamber $A^1$ may be regarded as forming a part, or an extension of the supply compartment $A^2$ of the weir tank proper.

While in accordance with the provisions of the statutes I have illustrated and described the best form of my invention now known to me, those skilled in the art will understand that the invention claimed herein is not limited in its broader aspects to the particular features of construction illustrated and described in detail therein.

Having now described my invention, what I claim as new and desire to secure by Letters Patent, is:

1. Liquid flow measuring apparatus comprising inlet and outlet compartments and a weir separating them, a source of liquid supply to said inlet compartment, and in combination therewith, means for equalizing the flow from said source including a reservoir receiving the liquid from said source, and two discharge connections leading from said reservoir to said inlet compartment at lower and upper levels respectively, the discharge connection from the lower level being restricted.

2. Liquid flow measuring apparatus comprising inlet and outlet compartments and a weir separating them, two sources of liquid supply to said inlet compartment, means for controlling the supply to said inlet compartment of liquid from one of the said sources in accordance with the accumulation of liquid in said outlet compartment, and means for equalizing the flow into said inlet compartment from said second source comprising a reservoir receiving the liquid from said last mentioned source and two discharge connections leading from said reservoir to said inlet compartment at lower and upper levels respectively, the discharge connection leading from the lower level being restricted.

3. In combination a metering heater comprising a heating chamber and a weir chamber having inlet and outlet compartments and a weir separating them, a main source of supply to the heating chamber of water to be heated, means for regulating the amount of water supplied from said source to said heating chamber in response to the accumulation of water in the outlet compartment of the weir chamber, and means for passing heater returns to said heating chamber comprising flow equalizing means consisting of an equalizing reservoir into which said returns are passed and two discharge connections leading from said reservoir to said heating chamber at upper and lower levels respectively, the discharge connection from the lower level being restricted.

JOSEPH W. GAMBLE.

Witnesses:
ARNOLD KATZ,
S. STEWART.